United States Patent
Shibuya et al.

[11] Patent Number: 6,031,629
[45] Date of Patent: Feb. 29, 2000

[54] PICTURE QUALITY STABILIZER FOR A COLOR LASER PRINTER

[75] Inventors: Takeshi Shibuya; Tatsunari Satou; Taisaku Seino, all of Ibaraki, Japan

[73] Assignee: Hitachi, Ltd., Tokyo, Japan

[21] Appl. No.: 09/003,597

[22] Filed: Jan. 7, 1998

[30] Foreign Application Priority Data

Jan. 8, 1997 [JP] Japan .................................. 9-001143

[51] Int. Cl.$^7$ .................................................. G03G 13/01
[52] U.S. Cl. .......................... 358/1.9; 358/1.1; 358/1.14; 358/503; 399/94; 399/97
[58] Field of Search ................................ 395/109, 101, 395/114; 358/503, 1.9, 1.1, 1.14; 399/94, 97

[56] References Cited

U.S. PATENT DOCUMENTS 5,109,275   4/1992   Naka et al. ............................ 358/80

FOREIGN PATENT DOCUMENTS

| 0 325 395 A2 | 7/1989 | European Pat. Off. | ......... H04N 1/46 |
| 0 370 482 A1 | 5/1990 | European Pat. Off. | ....... G03G 13/01 |
| 370 482 A1 | 5/1990 | European Pat. Off. | ................ 358/1.9 |
| 0 582 997 A1 | 2/1994 | European Pat. Off. | ......... H04N 1/46 |

*Primary Examiner*—Mark R. Powell
*Assistant Examiner*—Lance W. Sealey
*Attorney, Agent, or Firm*—Antonelli, Terry, Stout & Kraus, LLP

[57] ABSTRACT

In the picture quality stabilizer for a color laser printer, changes in the gray level characteristic and the color balance caused by changes in temperature and humidity are compensated in order to stabilize the reproduced image. The apparatus includes a temperature and humidity sensor, an upper-bound correction table, a gamma correction table and a mixed color correction table, each optimized with respect to a reference environment, interpolation means for those tables, and a gray level correction means for correcting the gray level with correction coefficients obtained by the interpolation means and the mixed color correction means for compensating any failure of the color balance with the linear transformation. With this configuration, the correction coefficients are so modified as to establish a stable gray level characteristic and color balance, and a stable reproduced image can be obtained.

6 Claims, 2 Drawing Sheets

PICTURE QUALITY STABILIZER FOR A COLOR LASER PRINTER

BACKGROUND OF THE INVENTION

The present invention relates to a color laser printer, specifically to a color laser printer which makes it possible to stabilize the quality of an image in response to environmental changes.

A printer using an electro-photographic method forms an electrostatic latent image by scanning an electrically charged surface of a photosensitive body using a laser beam, and performs image development by neutralizing the electrostatic latent image using a toner charged with a charge of the opposite polarity. As disclosed in Japanese Patent Application Laid-Open Number 07-128974 (1995), the amount of charge toner particle changes due to the environmental conditions of temperature and humidity. For example, under conditions of high temperature and high humidity, the amount of charge per single toner particle becomes smaller, and under conditions of low temperature and low humidity, the amount of charge per single toner particle becomes larger. Therefore, it should be noted in the general characteristic of the electrophotographic method used in a laser printer that a larger amount of toner is required for neutralizing the electrostatic latent image under an environmental condition of high temperature and high humidity, with the result that the reproduced image will have a higher density than will occur under an environmental condition of low temperature and low humidity.

In order to solve the above problem, it is proposed in Japanese Patent Application Laid-Open Number 07-128974 (1995) is controlling the development apparatus by using a toner density detector and a sensor for detecting temperature and humidity, and Japanese Patent Application Laid-Open Number 6-64238 (1994) proposes a method for correcting the laser intensity and switching the gamma correction tables by using a density sensor mounted on the photosensitive body.

However, in the prior art, since the relation between the number of toner particles and the printing density (lightness or saturation) is not necessarily linear, the control of toner density and the control of the maximum laser intensity may stabilize the whole paint density of the reproduced image, but there still remains a problem in that the intermediate gray level density can not stabilized.

With the method as disclosed in Japanese Patent Application Laid-Open Number 6-64238 (1994) in which a density sensor is mounted on the photosensitive body and the gamma correction tables are switched, since the image output is required for calibration, it is difficult to respond to dynamic changes in the environmental condition promptly. This makes it inconvenient for users to operate an office printer continuously all day long. Even in selecting and switching the gamma correction tables in response to detected parameters of temperature and humidity, many tables are required in order to respond smoothly changes in both the temperature and the humidity. On the other hand, in trying to reduce the number of tables, what is caused is a problem wherein the reproduced image becomes unstable at a transition operating condition at which the tables to be selected are switched.

In the case of color laser printers, as since the characteristics of different color ink materials are different from one another even for the same environmental conditions, and the change in the characteristic for a combination of color ink materials for a color mixture for a change in environmental conditions can not be resolved, which leads to a problem in that a change in the color balance can not be corrected.

SUMMARY OF THE INVENTION

An object of the present invention is to provide a dynamic correction function for establishing a stable gray scale characteristic and color balance when the environmental conditions of temperature and humidity change during the operation of a color laser printer.

The above object is attained by using a sensor for measuring the environmental temperature and humidity, a gray scale correction means for correcting individually the gray level of each color of Cyan (C), Magenta (M), Yellow (Y) and Black (K), and a mixed color correction means for correcting the value of the gray level of the individual color already corrected with the gray level correction means and for modifying the internal parameters of the mixed color correction means in responsive to changes in the environmental temperature and humidity.

With the configuration described above, by modifying the gray scale correction coefficients for the individual colors C, M, Y and K in response to the temperature and the humidity detected by the temperature and humidity sensor, a more stable gray level characteristic can be obtained for an individual single color. In addition, by modifying the coefficients of the mixed color correction means for correcting the effect of mixing color inks, the reproduced color of the mixed various color inks can be corrected and a stable color balance can be established.

These and other features of the invention will be apparent to those skilled in the art from the following detailed description of the invention, taken together with the accompanying drawings.

BRIEF DESCRIPTION OF THE DRAWINGS

In the drawings.

Corresponding numerals and symbols in different figures refer to corresponding parts unless otherwise specified.

DESCRIPTION OF THE PREFERRED EMBODIMENTS

Now, an embodiment of the present invention will be described with reference to the drawings.

At first, an outline of the procedure employed by the present invention will be described.

Figure 1:
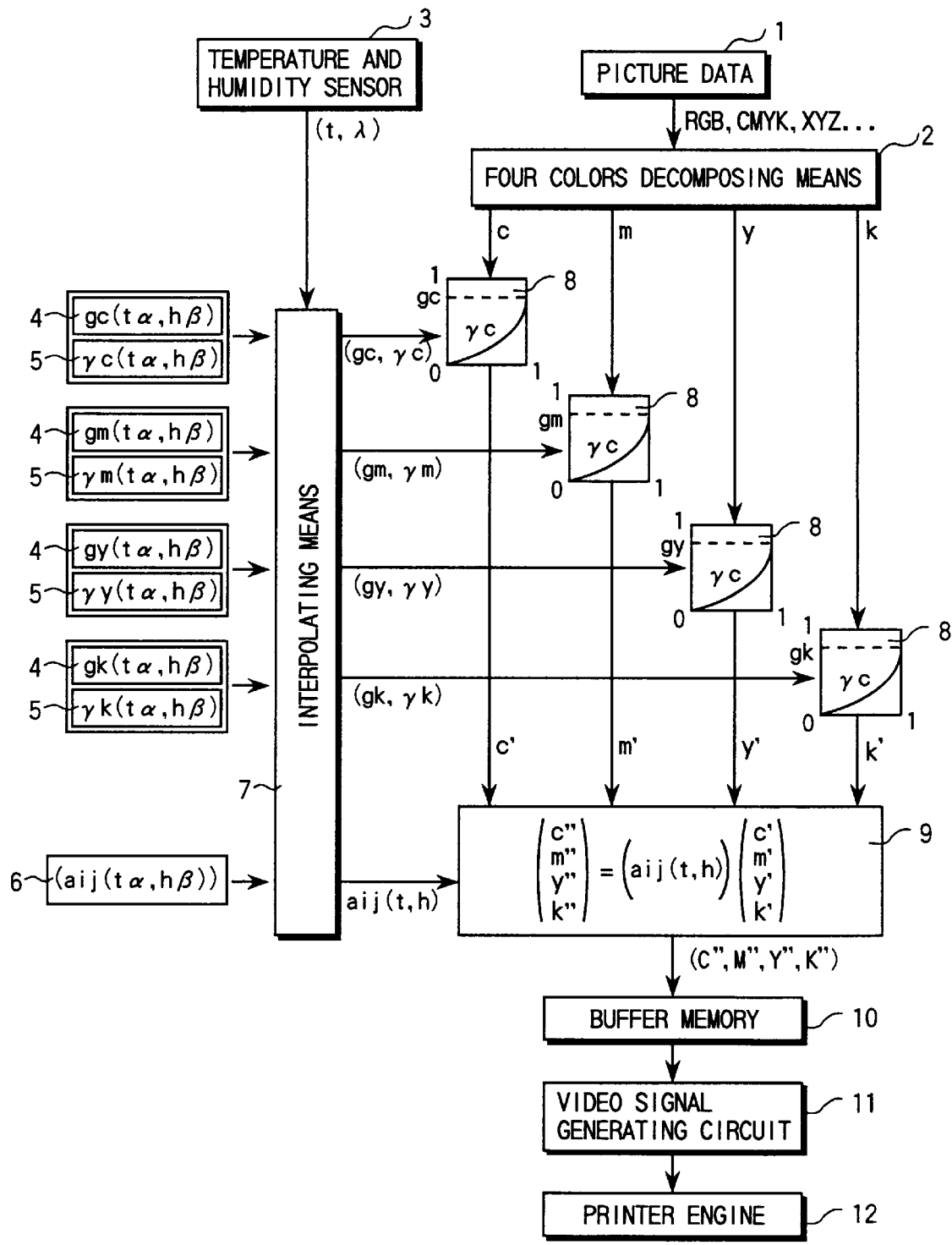
FIG. 1 is a schematic diagram of a data processing system of the present invention.

FIG. 1 shows a schematic diagram of the data processing system in accordance with the present invention. The image data 1 supplied by the main computer, for example, is decomposed by 4-color decomposing means 2 into point-ordered data represented by a combination of the values of gray levels of the individual colors, Cyan (C), Magenta (M), Yellow (Y) and Black (K). The gray level value is an integer generally defined to be between 0 and 255. For simplifying the following explanation, the gray level value will be normalized with 255 so as to be between 0 and 1. The whole black print image corresponds to the case wherein the gray level value is 1.

The individual gray level value of the colors (C, M, Y, K) is processed with the gray level correction generally designated "gamma correction" by using the gray level correction means 8. In this embodiment, the gray level value C for Cyan is corrected by the following formula (1), for example, $$c' = g_c(1-(1-c)^{\gamma_c}) \quad (1)$$

in which $g_c$ and $\gamma_c$ are corrected by the table interpolation means using a method to be described later from the values in the upper-bound correction table 4 and the gamma correction table 5. The upper-bound correction table 4 contains the gray level value when the saturation (or lightness) reaches and is maintained at a designated constant value as the gray level value increases with respect to the relation between the gray level and the saturation level.

Similarly, the table interpolation means is applied to the gray level values of M, Y and K. As the temperature and humidity characteristics of the color ink materials are generally different from one another, an upper-bound correction table 4 and a gamma correction table 5 are prepared for each individual color in this embodiment.

The gray level correction means 8 corrects the effect of the temperature and humidity on the individual gray scale characteristic of the single color, and the failure in the color balance caused by the effect of the temperature and humidity on the print characteristic with respect to the color superposition is corrected by the mixed color correction means 9 to be described below.

The mixed color correction means 9 uses a simple linear transformation, in which the coefficient $a_{ij}$ is defined by interpolating the values in the mixed color correction table 6 in response to the output from the temperature and humidity sensor 3.

The gray scale values (C", M", Y", K"), with their gamma characteristics and color balances corrected for the temperature and humidity environment by those correction means, are stored in the buffer memory 10, and next, the values are supplied as video signals to the printer engine 12 by the video signal generation circuit 11 in the plane order, whereby the printed output is finally obtained.

Figure 2:
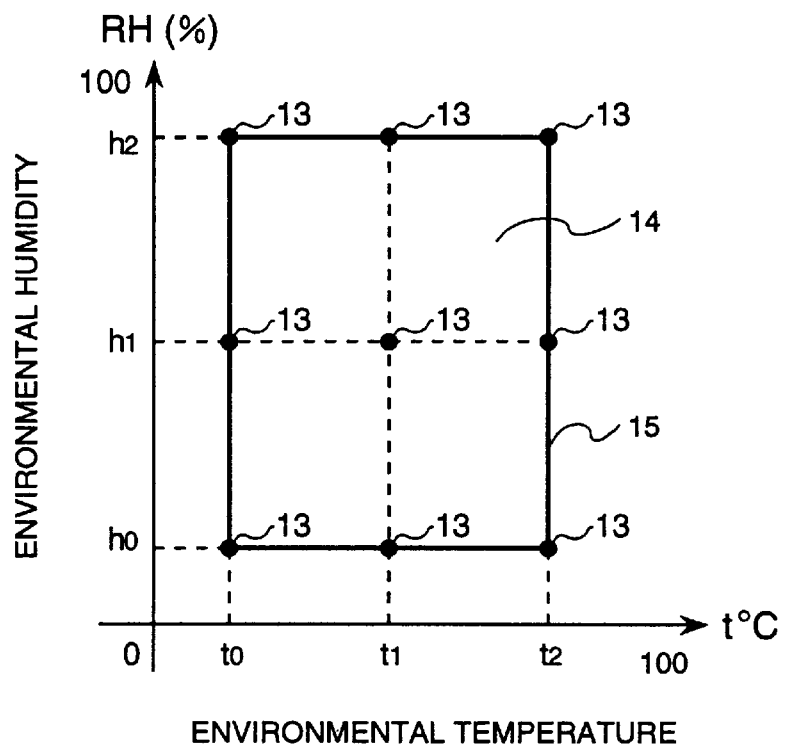
FIG. 2 is a characteristic diagram of reference temperature and humidity.

Next, detailed features of the correction table and the table interpolation means will be described. The individual correction table is composed of correction values for the reference environment 13 shown in FIG. 2. In FIG. 2, the reference environment 13 is so defined as to comprise a set of 9 combinations of the low temperature ($t_0$), the room temperature ($t_1$), the high temperature ($t_2$), and the low humidity ($h_0$), the room humidity ($h_1$), and the high humidity ($h_2$).

Figure 3:
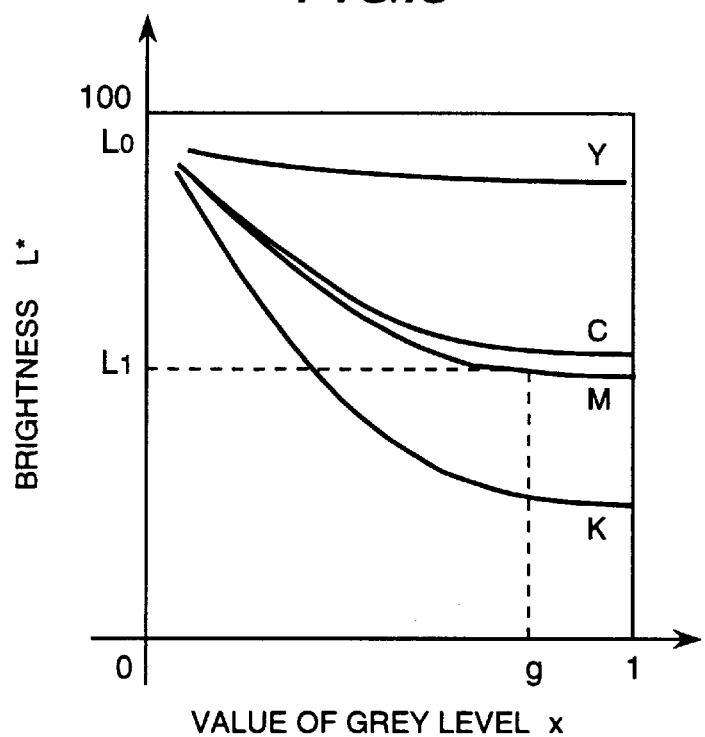
FIG. 3 is a graph which shows an example of the lightness gray level characteristic.

An example of the lightness characteristic without correction measured for one environment of the reference environment 13 is shown in FIG. 3. The parameters g in the upper-bound correction table 4 and the parameters g in the gamma correction table 5 are defined for the individual colors at the individual environments so that the error between the lightness characteristic shown in FIG. 3 and the model formula (2) shown below may be minimized.

$$\frac{L^* - L_1^*}{L_0^* - L_1^*} = \begin{cases} 1 - \left(1 - \frac{x}{g}\right)^{\gamma - 1} & (0 \le x \le g) \\ 1 & \text{(otherwise)} \end{cases} \quad (2)$$

Though g and γ are so defined as to make the lightness gray level characteristics of the individual colors linear, almost the same result can be obtained by making the chromaticity gray scale characteristic linear. However, as the chromaticity of the Black color is 0 in all the gray levels, it is desirable that the lightness gray level should be made linear for the Black color.

The coefficient $A=(a_{ij})$ of the mixed color correction table 6 is obtained in the following manner. At first, based on typically measured color values with the (n×n×n×n) combinations of the reference n gray levels of the individual colors, C, M, Y and K, a reproduced color estimation function for interpolating and estimating the measured color value corresponding to an arbitrary combination of gray level values is formed. As for this interpolation function, for example, the following scheme based on linear interpolation can be considered.

The gray level values of the colors C, M, Y and K to be interpolated are designated c, m, y and k. Assuming that the gray level values of the measurement points, with their gray level values closest to the individual gray level values, are c0, c1, m0, m1, y0, y1, k0 and k1, in which $c0 \le c \le c1$, $m0 \le m \le m1$, $y0 \le y \le y1$, and $k0 \le k \le k1$, and supposing that the calorimetric system is L*ab of CIE, the following formulae (3), (4) and (5) can be defined.

$$L*(c, m, y, k) = \sum_{p,q,r,s \in \{0,1\}} \backslash(\backslash\%\backslash)(-1)^{p+q+r+s} \quad (3)$$
$$(c - c_p)(m - m_q)(y - y_r)(k - k_s) L*(c_p, m_q, y_r, k_s)$$

$$b*(c, m, y, k) = \sum_{p,q,r,s \in \{0,1\}} \backslash(\backslash\%\backslash)(-1)^{p+q+r+s} \quad (4)$$
$$(c - c_p)(m - m_q)(y - y_r)(k - k_s) b*(c_p, m_q, y_r, k_s)$$

$$a*(c, m, y, k) = \sum_{p,q,r,s \in \{0,1\}} \backslash(\backslash\%\backslash)(-1)^{p+q+r+s} \quad (5)$$
$$(c - c_p)(m - m_q)(y - y_r)(k - k_s) a*(c_p, m_q, y_r, k_s)$$

This reproduced color estimation function is made to be obtained for the individual conditions of the reference environment 13. The mixed color correction coefficient $A=(a_{ij})$ at the ($t_i$, $h_j$) environment is determined by the least square method for minimizing the error between the reproduced color at the room temperature and humidity ($t_1$, $h_1$) environment for the combination (c, m, y, k) of the gray level values and the reproduced color of the ($t_1$, $h_j$) environment for the combination (c', m', y', k') obtained by linear conversion with the matrix $A=(a_{ij})$ from the combination (c, m, y, k).

The mixed color correction for four colors (c, m, y, k) is considered in the above description. In the case where the effect of the Black color on the color balance can be neglected, it is normally sufficient to consider a mixed color correction only for three colors (c, m, y).

The table correction means 7 for the upper-bound correction table 4, the g correction table 5 and the mixed color correction table 6 for the individual conditions of the reference environment 13 obtained so far is performed with the double linear interpolation scheme defined by the following formula (6).

$$g(t, h) = \quad (6)$$
$$\frac{t_{i+1} - t}{t_{i+1} - t_i} \frac{h_{j+1} - h}{h_{j+1} - h_j} \gamma(t_i, h_j) + \frac{t - t_i}{t_{i+1} - t_i} \frac{h_{j+1} - h}{h_{j+1} - h_j} \gamma(t_{i+1}, h_j) +$$
$$\frac{t_{i+1} - t}{t_{i+1} - t_i} \frac{h - h_j}{h_{j+1} - h_j} \gamma(t_i, h_{j+1}) + \frac{t - t_i}{t_{i+1} - t_i} \frac{h - h_j}{h_{j+1} - h_j} \gamma(t_{i+1}, h_{j+1})$$

In the above expression, $t_i \le t \le t_{(i+1)}$, $h_j \le h \le h_{(j+1)}$, for (i, j=0, 1). The value of g for the environment outside the region 14 is defined to be the interpolated value at the closest boundary 15. The interpolation scheme for the correction coefficient for other g's and $a_{ij}$'s can be established similarly.

As described above, the picture quality stabilizer for compensating for the changes in the gray level characteristic (g characteristic) and the color balance for the temperature and humidity environment can be obtained.

According to the above described component, including the temperature and humidity sensor, the upper-bound correction value table, the g correction table, the mixed color correction table, and the gray level correction means and the mixed color correction means with the parameters determined by the means for interpolating those tables, the gray level characteristic and the color balance for an arbitrary temperature and humidity environment can be compensated effectively.

While this invention has been described with reference to illustrative embodiments, this description is not intended to be construed in a limiting sense. Various modifications and combinations of the illustrative embodiments of the invention will be apparent to those skilled in the art upon reference to the description. It is, therefore, intended that the appended claims encompass any such modifications or embodiments.

We claim:

1. A picture quality stabilizer for a color laser printer in which a reproduced color is determined by specifying a gray level value of a plurality of colors, comprising:
    a sensor for measuring the temperature and humidity of the environment; and
    mixed color correction means for correcting color balance in response to a value measured by said sensor.

2. A picture quality stabilizer for a color laser printer in which a reproduced color is determined by specifying a gray level value of a plurality of colors, comprising:
    a sensor for measuring the temperature and humidity of the environment; and
    gray level correction means for correcting a gray level of an individual color in response to a value measured by said sensor.

3. A picture quality stabilizer for a color laser printer in which a reproduced color is determined by specifying an individual gray level value of colors including Cyan, Magenta, Yellow and Black, comprising:
    a sensor for measuring the temperature and humidity of the environment;
    gray level correction means for correcting a gray level of an individual color in response to a value measured by said sensor; and
    mixed color correction means for correcting an individual gray level value of an individual color corrected by said gray level correction means in response to measured temperature and humidity values and a superposition of colors.

4. A picture quality stabilizer for a color laser printer of claim 2 or 3, wherein
    said gray level correction means operates in accordance with a continuous function of either of temperature or humidity.

5. A picture quality stabilizer for a color laser printer of claim 2 or 3, wherein
    said gray level correction means includes an upper-bound correction value and a gamma correction value, and performs a transformation on the upper-bound correction value and gamma correction value by a continuous function of either of temperature or humidity represented by $y=g(1-(1-x)^r)$, in which x is input gray level value, g is an upper-bound correction value and y is output gray level value ($0 \leq x, y \leq 1$).

6. A picture quality stabilizer for a color laser printer of claim 1 or 3, wherein
    said mixed color correction means performs a linear transformation represented by a matrix including a component defined by a continuous function of either of temperature or humidity.

\* \* \* \* \*